United States Patent [19]

Tsutsumida et al.

[11] Patent Number: 5,213,313
[45] Date of Patent: May 25, 1993

[54] FLUID-FILLED CYLINDRICAL ELASTIC MOUNT HAVING LATERAL AND RADIAL ELASTIC WALLS FOR DESIRED AXIAL AND DIAMETRIC SPRING CHARACTERISTICS

[75] Inventors: Joji Tsutsumida, Komaki; Masatoyo Kagawa, Tajimi; Masaaki Hamada, Komaki, all of Japan

[73] Assignee: Tokai Rubber Industries, Ltd., Japan

[21] Appl. No.: 730,603

[22] Filed: Jul. 16, 1991

[30] Foreign Application Priority Data

Jul. 19, 1990 [JP] Japan .................. 2-76976[U]
Jul. 25, 1990 [JP] Japan .................. 2-78939[U]

[51] Int. Cl.⁵ .................................. B25B 1/02
[52] U.S. Cl. ............................ 267/140.12; 267/219
[58] Field of Search ............ 267/140.1 C, 141.2, 267/219; 180/300, 312; 248/562, 636, 638

[56] References Cited

U.S. PATENT DOCUMENTS

| | | | |
|---|---|---|---|
| 4,728,086 | 3/1988 | Ishiyama et al. | 267/140.1 C |
| 4,749,173 | 6/1988 | Kanda | 267/140.1 C |
| 4,840,359 | 6/1989 | Hamaekers et al. | 267/141.2 |
| 4,871,152 | 10/1989 | Funahashi | 267/140.1 C |
| 4,895,353 | 1/1990 | Roth et al. | 267/140.1 C |
| 4,941,649 | 7/1990 | Funahashi et al. | 267/140.1 C |
| 4,998,345 | 3/1991 | Funahashi et al. | 248/562 |
| 5,024,425 | 6/1991 | Schweidt | 267/140.1 C |
| 5,054,752 | 10/1991 | Tabata | 267/140.1 C |
| 5,076,532 | 12/1991 | Noguchi | 248/562 |

FOREIGN PATENT DOCUMENTS

| | | |
|---|---|---|
| 368352 | 5/1990 | European Pat. Off. |
| 4015213 | 11/1990 | Fed. Rep. of Germany ...... 248/562 |
| 61-31736 | 2/1986 | Japan . |
| 2207215 | 1/1989 | United Kingdom ......... 267/140.1 C |

Primary Examiner—Robert J. Oberleitner
Assistant Examiner—Chris Schwartz
Attorney, Agent, or Firm—Parkhurst, Wendel & Rossi

[57] ABSTRACT

A fluid-filled mount having first and second elastic bodies which elastically connect an inner and an outer sleeve and partially define a pressure-receiving chamber which communicates with a variable-volume equilibrium chamber through an orifice passage. The first elastic body includes two radial portions extending from diametrically opposite circumferential portions of the inner sleeve, in respective radial directions almost perpendicular to a diametric direction in which a static load acts on the mount. A connecting member extends from the inner sleeve between the above two radial portions and which is located on one of diametrically opposite sides of the inner sleeve on which the radial distance between the two sleeves is reduced by the static load. The second elastic body includes two thin-walled lateral walls which extend from respective axially opposite ends of the connecting member and which are inclined in a radially outward direction of the mount, and further includes two thick-walled radial walls which extend from the ends of the lateral walls in the above diametric direction.

12 Claims, 11 Drawing Sheets

FLUID-FILLED CYLINDRICAL ELASTIC MOUNT HAVING LATERAL AND RADIAL ELASTIC WALLS FOR DESIRED AXIAL AND DIAMETRIC SPRING CHARACTERISTICS

BACKGROUND OF THE INVENTION

1. Field of the Invention

The present invention relates in general to a fluid-filled cylindrical elastic mount suitably used for example as an engine mount for flexibly mounting on a motor vehicle a power unit which includes an internal combustion engine. More particularly, the present invention is concerned with a fluid-filled cylindrical engine mount which exhibits desired spring stiffness in the axial direction, without deterioration of damping/isolating characteristics with respect to input vibrations applied in the radial or diametric direction, and which is constructed for easy tuning of the diametric and axial spring characteristics relative to each other.

2. Discussion of the Prior Art

A so-called cylindrical elastic mount is known as one type of a mounting device which is interposed between two members of a vibration system for flexibly connecting the two members in a vibration-damping or -isolating fashion. This cylindrical elastic mount is constructed with an elastic or rubber body being formed between an inner metal sleeve, and an outer metal sleeve disposed radially outwardly of the inner sleeve with a suitable radial spacing therebetween. The elastic body elastically connects the inner and outer sleeves. The thus constructed cylindrical elastic mount is widely used as an engine mount for a motor vehicle, since the mount has various advantages, such as being compact and simple in construction and having a reduced size, and comparatively limited relative displacement of the inner and outer sleeves upon application of a vibrational load having a large amplitude.

Recently, there has been proposed a so-called fluid-filled cylindrical elastic mount as disclosed in U.S. Pat. No. 4,749,173 to R. Kanda owned by the assignee of the present application. Such a fluid-filled cylindrical elastic mount has a pressure-receiving chamber and an equilibrium chamber, which are formed between the inner and outer sleeves and are filled with a suitable non-compressible fluid. The equilibrium chamber is at least partially defined by a flexible diaphragm, so that the volume of the equilibrium chamber is variable. The two chambers are held in communication with each other through an orifice passage. Upon application of a dynamic vibrational load between the inner and outer sleeves of the elastic mount, the fluid pressure within the pressure-receiving chamber periodically changes, whereby the fluid is forced to flow through the orifice passage between the two chambers. Based on the resonance of the fluid mass flowing through the orifice passage, the fluid-filled elastic mount provides an excellent vibration damping/isolating effect, which cannot be obtained from a cylindrical elastic mount which relies on only the elasticity of an elastic body to damp the input vibrations.

In the fluid-filled cylindrical elastic mount as described above, the deformation of the elastic body occurs primarily as a compressive strain when the mount receives a vibrational load applied in the radial or diametric direction, and primarily as a shearing strain when the mount receives the vibrational load applied in the axial direction. This means considerably reduced spring stiffness or considerably soft spring characteristic in the axial direction, as compared with the spring stiffness in the diametric direction. Usually, the ratio of the spring stiffness in the axial direction to that in the diametric direction falls within a range of about 0.2–0.6, and cannot be increased beyond the upper limit of that range.

If the elastic body is formed of a rubber material having increased hardness in an attempt to increase the spring stiffness in the axial direction, the spring stiffness in the diametric direction tends to be excessively high, causing an accordingly reduced amount of compressive deformation of the elastic body upon application of the vibrations to the mount. This results in reduction in the amount of volumetric change of the pressure-receiving chamber and an accordingly reduced amount of change in the fluid pressure in the pressure-receiving chamber, leading to a decrease in the fluid mass which is forced to flow through the orifice passage. Thus, the solution indicated above leads to insufficient vibration damping-/isolating capability of the elastic mount.

In other words, the known fluid-filled cylindrical elastic mount inevitably suffers from undesirably low spring stiffness with respect to the vibrations applied in the axial direction, if the elastic mount is adapted to exhibit sufficiently high vibration damping/isolating capability with respect to the vibrations applied in the diametric direction. Consequently, if this known cylindrical elastic mount is used as an engine mount for an automotive vehicle, the power unit of the vehicle tends to be oscillated relative to the vehicle body in the axial direction of the elastic mount, deteriorating the driving comfort of the vehicle. The known fluid-filled cylindrical elastic mount has the problem discussed above.

SUMMARY OF THE INVENTION

It is accordingly an object of the present invention to provide a fluid-filled cylindrical elastic mount, in which the ratio of the diametric and axial spring stiffness values is tuned for providing sufficient spring stiffness in the axial direction without deteriorating the damping-/isolating capability with respect to the vibrations applied in the diametric direction.

The above object may be accomplished according to the principle of the present invention, which provides a fluid-filled cylindrical elastic mount for flexibly connecting two members such that a static load of one of the two members acts on the elastic mount in a diametric static-load-receiving direction thereof. The elastic mount has an inner sleeve fixed to one of the two members, an outer sleeve disposed radially outwardly of the inner sleeve and fixed to the other of the two members, a pressure-receiving chamber filled with a non-compressible fluid and operable to undergo a volumetric change and a pressure change of the fluid therein upon application of a dynamic vibrational load between the inner and outer sleeves, and a variable-volume equilibrium chamber at least partially defined by a flexible member and communicating with the pressure-receiving chamber through an orifice passage. The fluid-filled cylindrical elastic mount is characterized in that: the inner and outer sleeves are elastically connected by a first elastic body having two radial portions which extend toward the outer sleeve from diametrically opposite circumferential portions of the inner sleeve, in respective radial directions of the elastic mount which are almost perpendicular to the static-load-receiving direction; that a connecting member extends toward the outer sleeve from a circumferential portion of an axially intermediate part of the inner sleeve, which circumferential portion is circumferentially intermediate between the diametrically opposite circumferential portions, the connecting member being located on one of diametrically opposite sides of the inner sleeve as seen in the static-load-receiving direction, on which a radial distance between the inner and outer sleeves is reduced by the static load; that a second elastic body is disposed in fixed relation with the connecting member, the second elastic body including two lateral elastic walls which extend from respective opposite end faces of the connecting member which are opposed to each other in an axial direction of the elastic mount, the two lateral elastic walls being inclined by a predetermined angle in a radially outward direction of the inner sleeve as the lateral elastic walls extend in the axial direction, the second elastic body further including two radial elastic walls which have a larger thickness than the two lateral elastic walls and which extend from respective ends of the two lateral elastic walls in a radial direction parallel to the static-load-receiving direction; that the connecting member and the second elastic body cooperating to define a pocket closed by the outer sleeve, to define the pressure-receiving chamber; and that the equilibrium chamber is disposed on the other of the diametrically opposite sides of the inner sleeve on which the radial distance between the inner and outer sleeves is increased by the static load.

In the fluid-filled cylindrical elastic mount constructed according to the present invention, the deformation of the first and second elastic bodies upon application of a dynamic vibrational load thereto in the radial or diametric static-load-receiving direction takes place primarily as shearing deformation or strain of the lateral elastic walls of the second elastic body. As a result, the lateral elastic walls of the second elastic body cooperate with the connecting member to act as a reciprocating piston which is reciprocatingly oscillated into and out of the pressure-receiving chamber as the inner sleeve is radially oscillated relative to the outer sleeve upon application of the vibrational load in the diametric static-load-receiving direction. The reciprocating movement of the connecting member causes a periodic change in the fluid pressure within the pressure-receiving chamber, whereby a relatively large amount of the fluid is forced to flow through the orifice passage. Thus, the present elastic mount exhibits an improved vibration damping/isolating effect based on the resonance of the fluid flow through the orifice passage.

Further, the thickness, and the predetermined angle of inclination, of the two lateral elastic walls of the second elastic body are determined so that the spring stiffness values of the present fluid-filled cylindrical elastic mount in the diametric and axial directions are both determined primarily by the first elastic body. Moreover, the first elastic body undergoes primarily shearing deformation when it is subjected to the vibrational load, irrespective of the direction in which the load is applied to the elastic mount. Namely, both the vibrations applied in the diametric direction and the vibrations applied in the axial direction cause the deformation of the first elastic body to occur primarily in the form of shearing strain. According to this arrangement, the ratio of the spring stiffness in the axial direction to that in the diametric direction can be optimally adjusted by suitably determining the dimensions (such as thickness and axial width) of the first elastic body. The first elastic body may be tuned so that the spring stiffness in the axial direction is higher than that in the diametric direction.

Therefore, the present fluid-filled elastic mount exhibits excellent damping/isolating characteristic with respect to vibrations applied in the diametric direction (static-load-receiving direction), based on the resonance of the fluid flow through the orifice passage, while at the same time assures sufficiently high spring stiffness in the axial direction, to effectively minimize the axial oscillating movement of the power unit relative to the vehicle body, thereby permitting enhanced driving comfort of the vehicle.

Generally, the fluid flow through the orifice passage between the pressure-receiving and equilibrium chambers is effective to damp and/or isolate the vibrations having relatively low frequencies between a few Hz up to about 30 Hz, typically in the neighborhood of 15 Hz, for example. To effectively damp or isolate the vibrations having relatively high frequencies from about 100 Hz to about 250 Hz, for example, it is desirable to provide means which extends from inner surfaces of the radial elastic walls of the second elastic body, for defining a flow restrictor which substantially divides the pressure-receiving chamber in the static-load-receiving direction, into a radially inner and a radially outer section. According to this preferred form of the invention, the cross sectional area and other dimensions of the flow restrictor are suitably adjusted or tuned so that the elastic mount exhibits a sufficiently low dynamic spring constant with respect to the high-frequency vibrations, based on the resonance of the fluid flow through the flow restrictor within the pressure-receiving chamber.

Since the flow restrictor is formed by simply providing the radial elastic walls with suitable means which extend from its inner surfaces into the pressure-receiving chamber, the structure for defining the flow restrictor is relatively simple and is economical to manufacture, as compared with a restrictor member provided in the known elastic mount disclosed in U.S. Pat. No. 4,749,173 referred to above. This restrictor member is fixed to a stopper block, which in turn is press-fitted on the inner sleeve. The press-fitting of this stopper block on the inner sleeve must be effected before the inner assembly of the elastic mount is prepared in a vulcanization process in which the elastic body is formed between the inner and outer sleeves.

Further, the means for defining the flow restrictor will not come into abutting contact with the inner surfaces of the pressure-receiving chamber, even when the elastic mount is subjected to the dynamic vibrational load having a large amplitude. In other words, the provision of the flow restrictor does not induce a possibility of lowering the vibration damping and/or isolating characteristics and deteriorating operational durability of the elastic mount. In the known elastic mount as disclosed in the above-identified U.S. patent, the restrictor member may abut on the inner surfaces of the pressure-receiving chamber, when the inner sleeve is excessively displaced relative to the outer sleeve, in the axial or circumferential or rotational direction.

For example, the means for defining the flow restrictor consists of extensions of rigid plates which are embedded in the two radial elastic walls, to prevent expansion of the radial elastic walls in the axial direction of the elastic mount, which expansion would occur upon application of the dynamic vibrational load in the staticload-receiving direction. The extensions of the rigid plates extend in the axial direction from the axially opposite inner surfaces of the two radial elastic walls into the pressure-receiving chamber, such that the flow restrictor is defined by opposed end faces of the extensions which are remote from the axially opposite inner surfaces of the two radial elastic walls in the axial direction.

In the above form of the invention, the rigid plates serve two functions, that is, prevent the expansion of the radial elastic walls in the axial direction, and define between their extensions the flow restrictor within the pressure-receiving chamber. Thus, the flow restrictor is formed by utilizing the rigid plates, or without using exclusive members. Accordingly, the instant elastic mount is simple in construction, and easy and economical to manufacture, as compared with the above-indicated known elastic mount using the restrictor member fixed to the inner sleeve.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
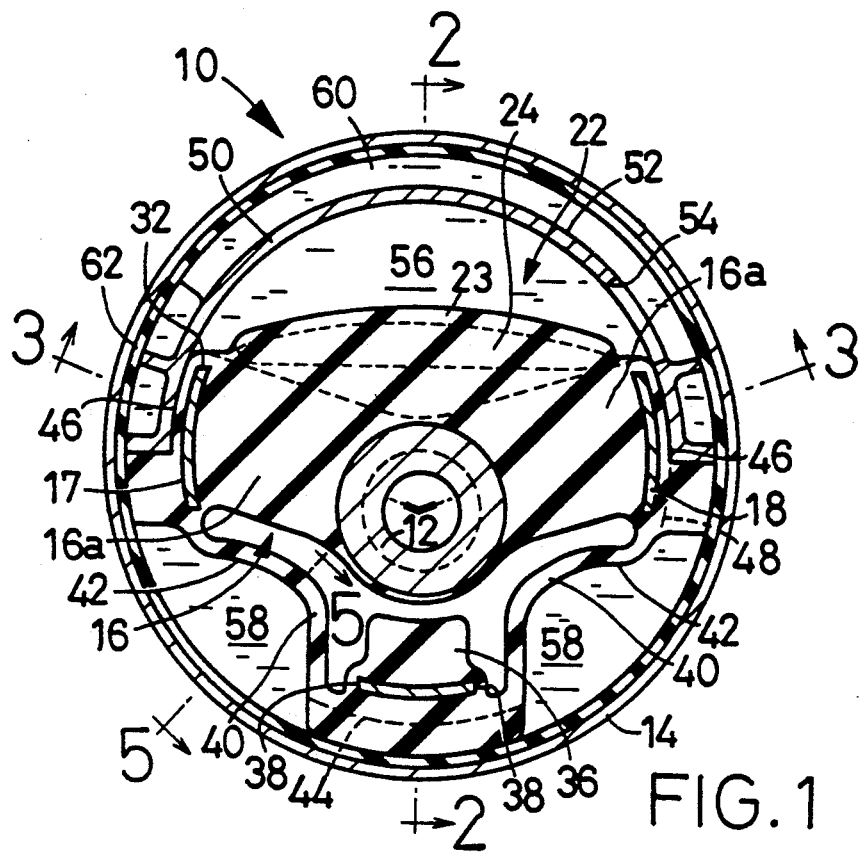
FIG. 1 is an elevational view in transverse cross section of one embodiment of a fluid-filled cylindrical elastic mount of the present invention in the form of an engine mount.

Referring first to FIGS. 1-5, there is shown an engine mount 10 for a motor vehicle, which is constructed according to one embodiment of this invention. The engine mount 10 has an inner metal sleeve 12, and an outer metal sleeve 14 which is disposed radially outwardly of the inner sleeve 12 such that the axis of the inner sleeve 12 is eccentrically offset a suitable amount from the axis of the outer sleeve 14 in the radial or diametric direction in which a dynamic vibrational load is applied to the engine mount 10. The inner and outer sleeves 12, 14 are elastically connected to each other by a first elastic body 16 formed therebetween.

Figure 10:
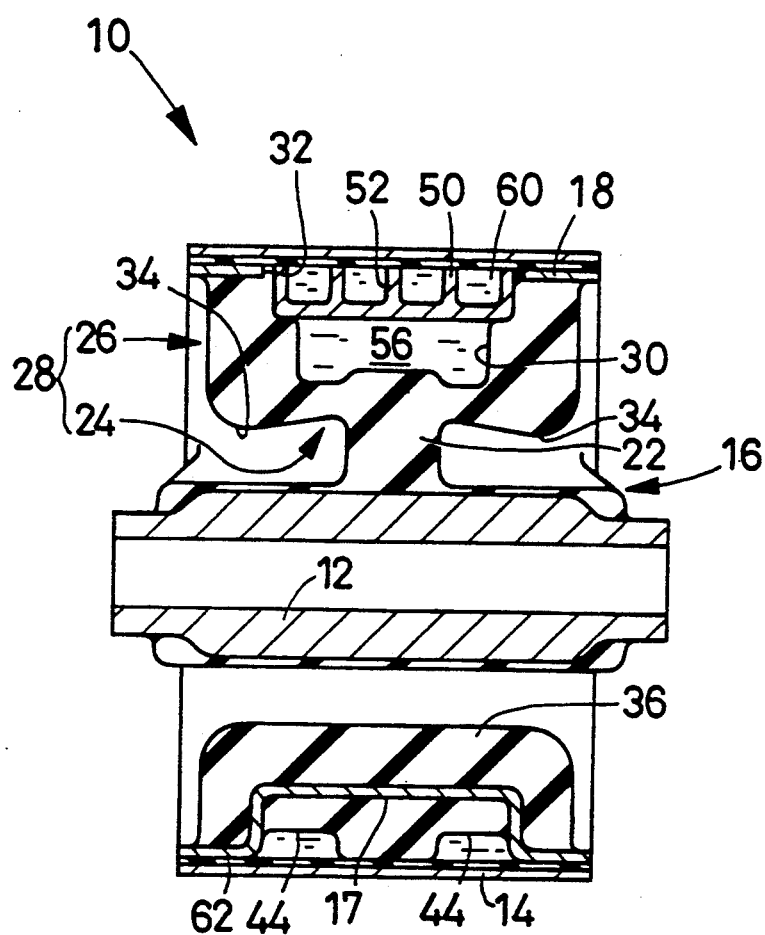
FIG. 10 is an elevational view in axial cross section corresponding to that of FIG. 2, showing the engine mount as installed on a motor vehicle.

The engine mount 10 is installed on the motor vehicle such that the inner sleeve 12 is fixed to the vehicle body while the outer sleeve 14 is fixed to a power unit of the vehicle which includes an engine, so that the power unit is flexibly mounted on the vehicle body, by means of the engine mount 10. In this condition, the weight of the power unit (i.e., static load) and a dynamic vibrational load act on the engine mount 10, in the diametric direction in which the inner and outer sleeves 12, 14 are eccentric from each other, i.e., in the vertical direction as seen in FIG. 1. This direction will be referred to as "static-load-receiving direction" where appropriate. With the static load applied to the outer sleeve 14, the inner and outer sleeves 12, 14 are substantially concentric or coaxial with each other, as indicated in FIG. 10, which shows the engine mount 10 as installed on the motor vehicle.

Figure 2:
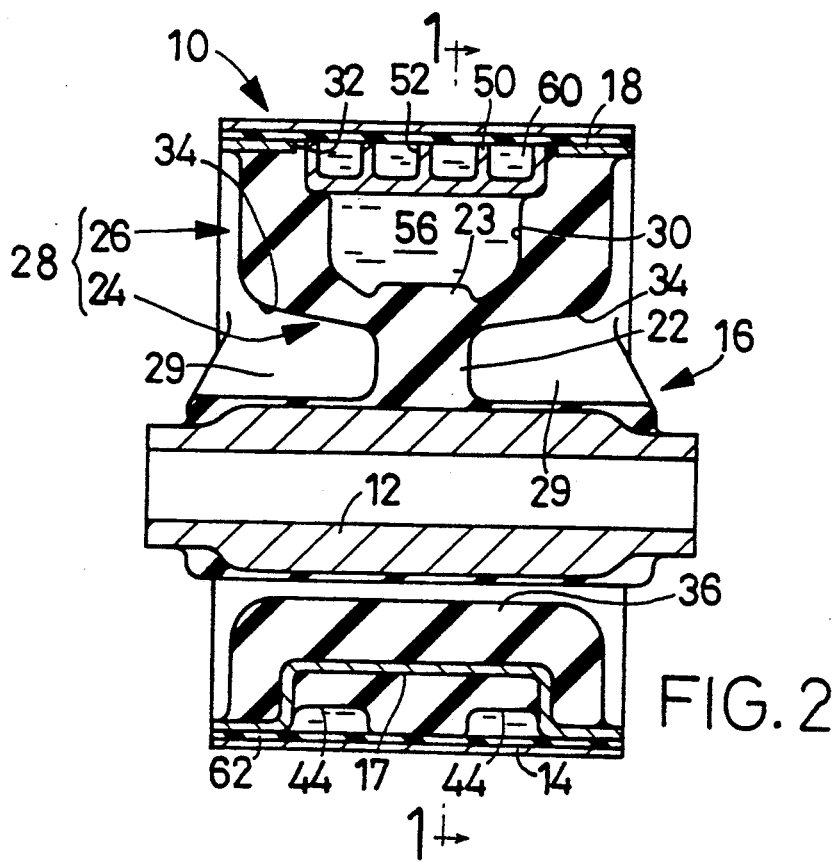
FIG. 2 is an elevational view in axial cross section of the engine mount taken along line 2—2 of FIG. 1.
Figure 3:
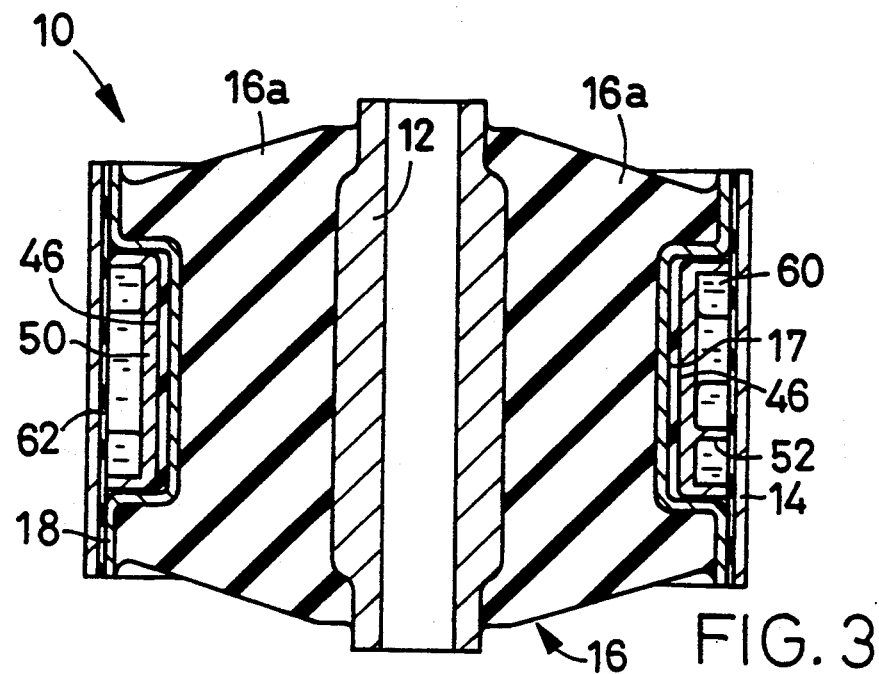
FIG. 3 is a cross sectional view taken along line 3—3 of FIG. 1.
Figure 4:
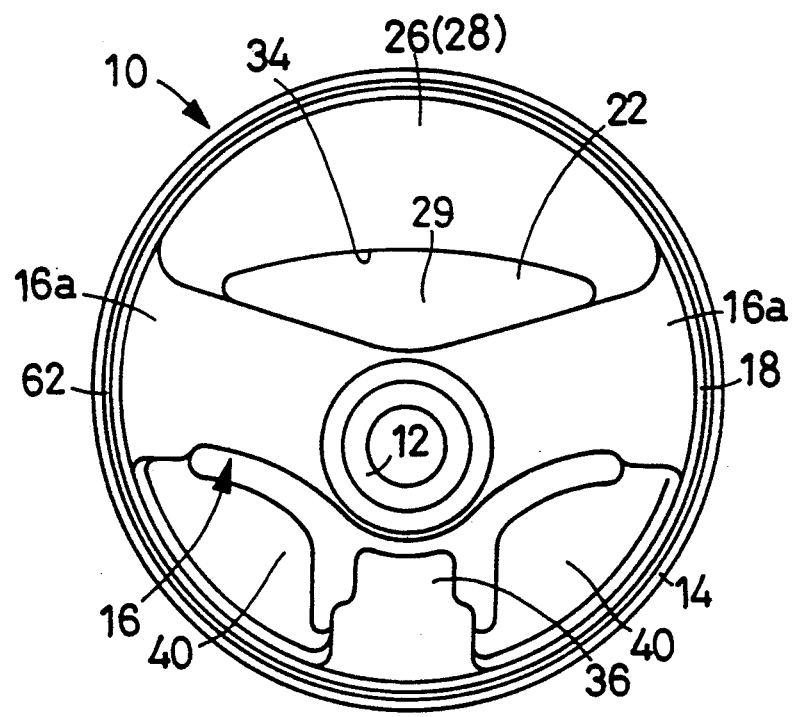
FIG. 4 is an elevational end view taken toward the right end of the engine mount as seen in FIG. 2.
Figure 5:
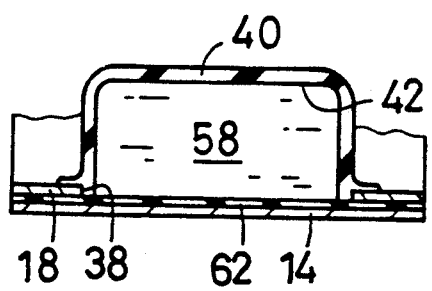
FIG. 5 is a cross sectional view taken along line 5—5 of FIG. 1.

Described in detail, the inner sleeve 12 is a generally cylindrical member having a relatively large wall thickness. Radially outwardly of this inner sleeve 12, there is disposed an intermediate metal sleeve 18 in an eccentric relation with the inner sleeve 12 and in a concentric relation with the outer sleeve 14. The intermediate sleeve 18 is a cylindrical member which has a relatively small wall thickness, and an axially intermediate portion having a relatively small diameter that defines an annular groove 17. This groove 17 is open in the outer surface of the intermediate sleeve 18 and has a suitable axial length, as indicated in FIGS. 2 and 3. The first elastic body 16 is formed between the inner sleeve 12 and the intermediate sleeve 18. These three members 12, 16, 18 provide an inner assembly 20 of the engine mount 20 as shown in FIGS. 6-8, in which the inner and intermediate sleeves 12, 18 are elastically connected to each other by the first elastic body 16.

Figure 6:
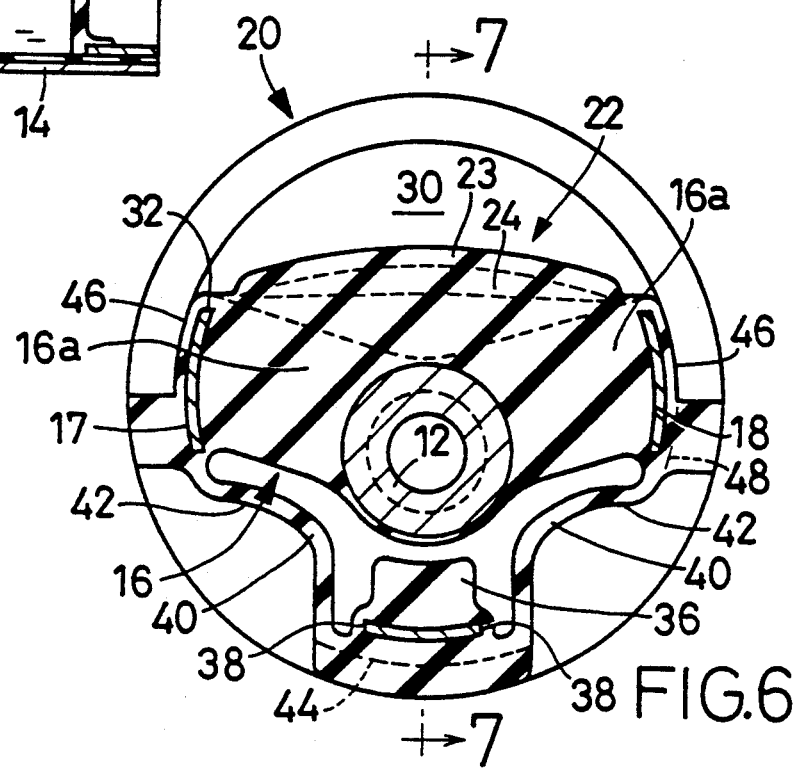
FIG. 6 is an elevational view in transverse cross section of an inner assembly of the engine mount of FIG. 1, which is prepared in a vulcanization process during manufacture of the engine mount.

As shown in FIGS. 1, 3 and 6, the first elastic body 16 is formed so as to extend from diametrically opposite circumferential portions of the inner sleeve 12, in the radial directions of the engine mount 10 which is almost perpendicular to the static-load-receiving direction in which the static and dynamic loads are applied to the engine mount. In other words, the circumferential portions of the inner sleeve 12 from which the first elastic body 16 extends toward the intermediate sleeve 18 are diametrically opposed to each other in the diametric direction substantially perpendicular to the static-load-receiving direction. In the present embodiment, two radial portions 16a of the first elastic body 16 which extend from the respective circumferential portions of the inner sleeve 12 are inclined upwardly (as seen in FIGS. 1 and 6) by a suitable small angle, with respect to the diametric direction perpendicular to the static-load-receiving direction, such that the radial ends of the two radial portions 16a at which the first elastic body 16 contacts the intermediate sleeve 18 are located on one of the diametrically opposite sides of the inner sleeve 12 on which the radial offset distance between the inner and intermediate sleeves 12, 18 in the static-load-receiving direction is larger than the other side. When the engine mount 10 is installed on the vehicle, with the weight or static load of the power unit acting on the first elastic body 16 via the outer and intermediate sleeves 14, 18, the first elastic body 16 is deformed such that two radial portions 16a of the elastic body 16 between the two sleeves 12, 18 are made parallel to the diametric direction perpendicular to the static-load-receiving direction.

Figure 7:
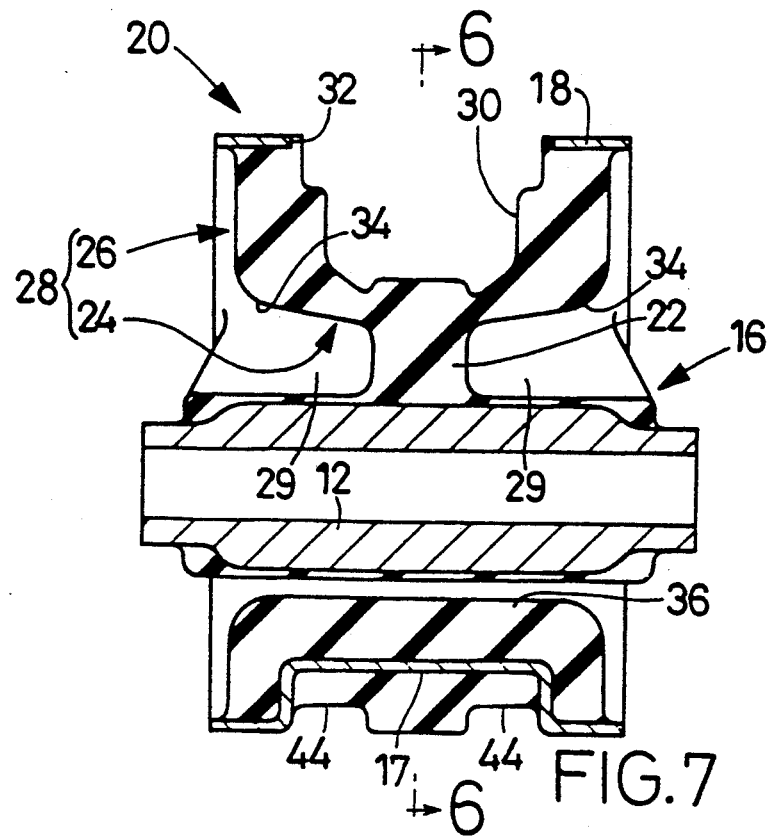
FIG. 7 is an elevational view taken along line 7—7 of FIG. 6.
Figure 8:
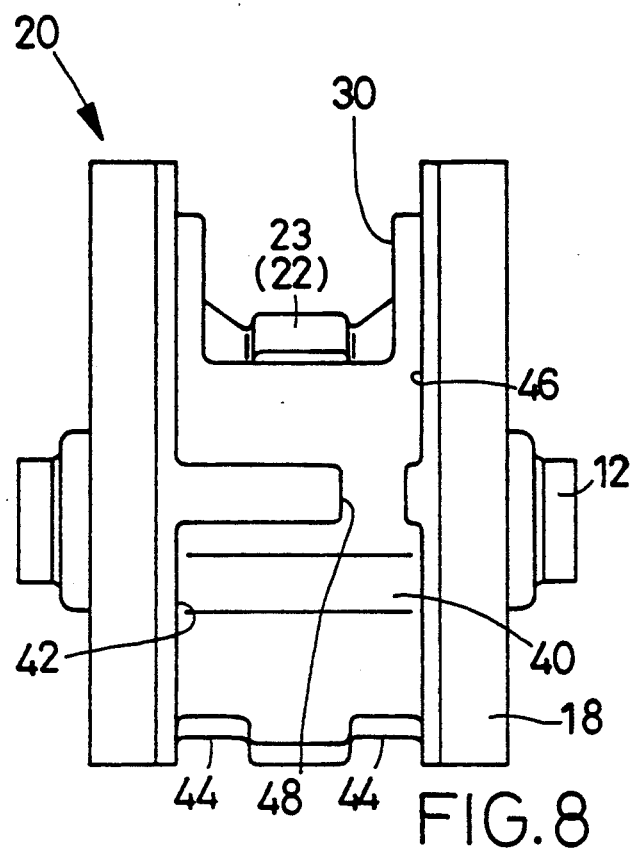
FIG. 8 is an elevational side view taken toward the right-hand side of the inner assembly as seen in FIG. 6.

A connecting member in the form of a central protrusion 22 is formed integrally with the first elastic body 16, such that the central protrusion 22 extends from an axially central portion of the inner sleeve 12, as indicated in FIGS. 2 and 7. More specifically, the central protrusion 22 extends toward the outer sleeve 14, from a circumferential portion of the inner sleeve 12 which is circumferentially intermediate between the two diametrically opposite circumferential portions from which the two radial portions 16a of the first elastic body 16 extend. As shown in FIGS. 1 and 6, the central protrusion 22 is located on one of the diametrically opposite sides of the inner sleeve 12 on which the radial offset distance between the two sleeves 12, 18 as seen in the static-load-receiving direction is larger than the other side, namely, on the diametric side on which the radial distance between the two sleeves 12, 14 is reduced by the weight of the power unit. The central protrusion 22 as the connecting member has a suitable height as measured from the circumferential surface of the inner sleeve 12 in the radial direction. The function of this central protrusion 22 will be described.

Integrally with the central protrusion 22, there are formed a pair of lateral elastic walls 24, 24 which have a relatively small thickness and which are formed of an elastic rubber material. As indicated in FIGS. 2 and 7, these lateral elastic walls 24, 24 extend from the axially opposite end faces of the central protrusion 22, generally in the opposite axial directions of the engine mount 10, but with a relatively small angle of inclination in the radially outward direction of the mount. The lateral elastic walls 24, 24 cooperate with a pair of radial elastic walls 26, 26 to constitute a second elastic body 28. The radial elastic walls 26, 26, whose thickness is larger than that of the lateral elastic walls 24, 24 are also formed of an elastic rubber material, such that the radial elastic walls 26, 26 extend from the respective axial ends of the lateral elastic walls 24, 24 and contact the inner surface of the intermediate sleeve 18. As indicated in FIG. 7, the two radial elastic walls 26, 26 are spaced apart from each other in the axial direction of the inner sleeve 12, and cooperate with the central protrusion 22 to define a first pocket 30. The intermediate sleeve 18 has a first window 32 through which the first pocket 30 is open in the outer circumferential surface of the sleeve 18, as shown in FIG. 7.

Each of the two lateral elastic walls 24, 24 of the second elastic body 28 cooperates with the outer sleeve 14 and the two radial portions 16a of the first elastic body 16, to define a recess 29.

When the static and dynamic loads are applied to the second elastic body 28 via the sleeves 12, 14, 18, central protrusion 22 and first elastic body 16, the two lateral walls 24, 24 are subjected to a shearing force or stress and undergo shearing deformation or strain, while the two radial walls 26, 26 are subjected to a compressive force or stress and undergo compressive deformation or strain. In this respect, it will be understood that the central protrusion 22 functions to connect the inner sleeve 12 and the second elastic body 28. The radially inner end faces of the radial elastic walls 26, 26 provide respective stopper surfaces 34, which are normally spaced apart from the outer circumferential surface of the inner sleeve 12, in the static-load-receiving direction. The stopper surfaces 34 are adapted to abut on the outer circumferential surface of the inner sleeve 12 upon application of an excessive amount of vibrational load, to thereby prevent excessive deformation of the first and second elastic bodies 16, 28. For convenience sake, the radial direction in which the stopper surfaces 34 abut on the inner sleeve 12 is referred to as "bounding direction", and the radial direction in which the stopper surfaces 34 move away from the inner sleeve 12 is referred to as "rebounding direction".

A stopper rubber block 36 is formed on a circumferential portion of the inner surface of the intermediate sleeve 18 at which the radial offset distance between the sleeves 12, 18 is the smallest. That is, the circumferential portion indicated above is diametrically opposite to the circumferential portion from which the central protrusion 22 extends. The stopper rubber block 36 is spaced apart from the inner sleeve 12 in the static-load-receiving direction, and is adapted for abutting contact with the inner sleeve 12, upon application of an excessive vibrational load, to thereby prevent an excessive amount of deformation of the first and second elastic bodies 16, 28 in the rebounding direction.

The intermediate sleeve 18 has a pair of second windows 38 formed in respective circumferential portions thereof, which are located on the opposite sides of the stopper rubber block 36 as viewed in the circumferential direction of the sleeve 18, as shown in FIG. 6. These two second windows 38 are closed by respective flexible diaphragms 40, 40, which extend from a rubber layer formed on a portion of the outer circumferential surface of the intermediate sleeve 18 which corresponds to the stopper rubber block 36. The diaphragms 40 and the rubber layer are formed integrally with the first and second elastic bodies 16, 28 and central protrusion 22, and are secured by vulcanization to the intermediate sleeve 18.

The two diaphragms 40, 40 define a pair of second pockets 42, 42 which are open through the respective second windows 38, 38 of the intermediate sleeve 18, as indicated in FIG. 6. These two second pockets 42, 42 communicate with each other through communication grooves 44, 44 which are defined within the annular groove 17 of the intermediate sleeve 18, as shown in FIGS. 6 and 7.

The parts of the intermediate sleeve 18 which define the annular groove 17 provide two U-shaped support portions 46 which include the circumferential ends of the first window 32 and which are adjacent to the circumferential ends of the first pocket 30. One of the two support portions 46 has a communication groove 48 for fluid communication with the nearer one of the two second pockets 42, as shown in FIGS. 6 and 8.

The inner assembly 20 constructed as described above is assembled with an orifice member 50 and the outer sleeve 14, such that the orifice member 50 closes the first pocket 30 and the outer sleeve 14 is fitted on the intermediate sleeve 18, so as to cover the outer surface of the orifice member 50.

Figure 9:
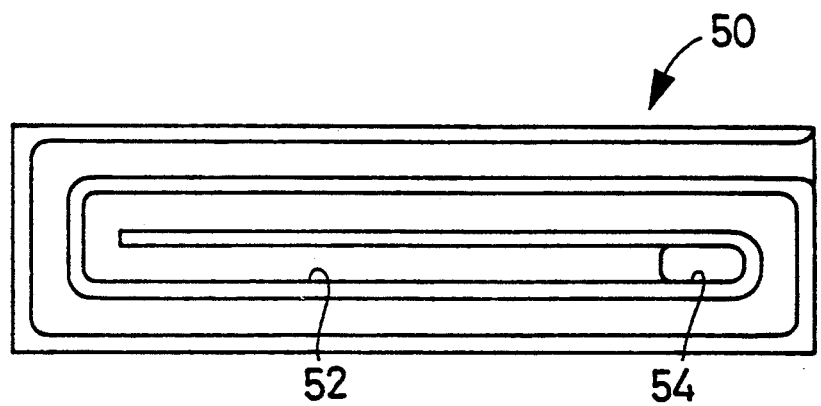
FIG. 9 is a plan view of a semi-cylindrical orifice member of the engine mount of FIG. 1 as flattened.

The orifice member 50 is a semi-cylindrical member assembled on the inner assembly 20 such that the circumferentially opposite end portions of the orifice member 50 are fitted in the two U-shaped support portions 46 of the intermediate sleeve 18, as indicated in FIG. 1. The orifice member 50 has a generally spiral groove 52 formed in its outer surface, as shown in FIG. 9 which shows the semi-cylindrical member 50 in its flattened state. The orifice member 50 has a throughhole 54 formed therethrough in communication with the inner end of the spiral groove 52. The outer end of the spiral groove 52 is open in one of the circumferentially opposite end faces of the orifice member 50. With the orifice member 50 fitted on the intermediate sleeve 18 of the inner assembly 20, the spiral groove 52 communicates with the first pocket 30 through the throughhole 54, and with one of the second pockets 42 through the opening at the outer end of the groove 52.

After the orifice member 50 is fitted on the inner assembly 20, the outer sleeve 14 is fitted on the inner assembly 20. Then, the outer sleeve 14 is radially inwardly compressed against the intermediate sleeve 18, by using eight drawing dies disposed around the circumference of the outer sleeve 14, for example. Thus, the first pocket 30 is closed by the orifice member 50, whereby a pressure-receiving chamber 56 is formed. Further, the second pockets 42, 42 are closed by the outer sleeve 14, whereby two equilibrium chambers 58, 58 are formed. The outer sleeve 14 is coated at its inner circumferential surface with a sealing rubber layer 62, which is formed in the vulcanization process. The sealing rubber layer 62 squeezed between the intermediate and outer sleeves 18, 14 assures fluid-tightness of the pressure-receiving and equilibrium chambers 56, 58.

Each of the recesses 29, 29 extends over a substantially entire length of the pressure-receiving chamber 56 in a direction perpendicular to the static-load-receiving direction and axial direction of the elastic mount 10. The central protrusion 22 includes a protruding portion 23 which protrudes into the pressure-receiving chamber 56 from the bottom wall of the chamber 56 defined by the two lateral elastic walls 24.

The pressure-receiving and equilibrium chambers 56, 58 are filled with a suitable non-compressible fluid, which is selected so as to give the engine mount 10 a desired damping/isolating characteristic based on the flow of the fluid through an orifice passage 60 connecting the pressure-receiving chamber 56 and the equilibrium chambers 58. Preferably, water, alkylene glycol, polyalkylene glycol, silicone oil or other fluid having a relatively low viscosity value is used a the non-compressible fluid. The filling of the chambers 56, 58 is effected by fitting the orifice member 50 and outer sleeve 14 on the inner assembly 20, within a mass of the selected non-compressible fluid contained in a suitable vessel.

The orifice passage 60 indicated above is formed such that the spiral groove 52 formed in the outer surface of the orifice member 50 is fluid-tightly closed by the outer sleeve 14. The orifice passage 60 permits the non-compressible fluid to flow between the pressure-receiving chamber 56, and the equilibrium chambers 58. With the outer sleeve 14 mounted on the inner assembly 20, the communication grooves 44 are also closed, to thereby provide passages through which the two equilibrium chambers 58, 58 communicate with each other. In the present embodiment in which the orifice passage 60 takes the form of a spiral channel having a sufficiently large length, input vibrations having relatively low frequencies such as engine shakes and bounce can be effectively damped, based on the resonance of the fluid masses flowing through the orifice passage 60. In other words, the dimensions (length and cross sectional area of fluid flow) of the orifice passage 60 are suitably determined or tuned so as to provide an effective damping effect with respect to the low-frequency vibrations.

The thus constructed engine mount 10 is installed on the motor vehicle such that the inner sleeve 12 is fixed to the vehicle body while the outer sleeve 14 is fixed to the power unit of the vehicle. The engine mount 10 is circumferentially oriented so that the inner and outer sleeves 12, 14 are eccentrically offset from each other in the vertical direction. Namely, the engine mount 10 is circumferentially positioned so that the weight of the power unit acts on the engine mount 10 and a dynamic vibrational load is applied to the engine mount primarily in the static-load-receiving direction in which the inner and outer sleeves 12, 14 are eccentrically offset from each other. With the engine mount 10 thus installed on the vehicle, the inner and outer sleeves 12, 14 are made substantially concentric or coaxial with each other, with the static load of the power unit acting on the outer sleeve 14, as indicated in FIG. 10.

When a dynamic vibrational load is applied to the engine mount 10, the inner and outer sleeves 12, 14 are oscillated relative to each other in the static-load-receiving diametric direction, due to elastic deformation of the first and second elastic bodies 16, 28, whereby the fluid pressure within the pressure-receiving chamber 56 periodically changes, causing the fluid to flow through the orifice passage 60 due to a pressure difference between the pressure-receiving and equilibrium chambers 56, 58. In this manner, the engine mount 10 exhibits an effective damping effect with respect to engine shakes and bounce or other vibrations having relatively low frequencies, based on the resonance of the fluid mass which is forced to flow through the orifice passage 60.

With the vibrational load applied to the pressure-receiving chamber 56, the radially outwardly inclined lateral elastic walls 24 defining the bottom portion of the chamber 56 undergo shearing deformation while the radial elastic walls 26, 26 defining the axially opposite walls of the chamber 56 undergo compressive deformation. Further, since the lateral elastic walls 24 have a considerably smaller thickness than the radial elastic walls 26, the deformation of the pressure-receiving chamber 56 takes place primarily as the shearing deformation of the lateral elastic walls 24. Accordingly, the central protrusion 22 formed between the inner sleeve 12 and the second elastic body 28 undergoes only a small amount of compressive deformation. As a result, the central protrusion 22 is radially oscillated like a reciprocating piston, into and out of the pressure-receiving chamber 56, with a relatively large amount of shearing deformation of the lateral elastic walls 24, 24, when the inner sleeve 12 is oscillated relative to the outer sleeve 14. The reciprocating movement of the central protrusion 22 is quite effective to induce the periodic pressure change in the pressure-receiving chamber 56 when the vibrational load is applied between the inner and outer sleeves 12, 14.

In connection with reciprocating movement of the central protrusion 22, it is noted that the lateral elastic walls 24, 24 are almost parallel to the axial direction of the inner sleeve 12, with the weight of the power unit acting on the outer sleeve 14, as indicated in FIG. 10, during use of the engine mount 10 on the vehicle. In this condition, a relatively small amplitude of the input vibration will cause the central protrusion 22 to effect the radial piston-like reciprocating movement relative to the pressure-receiving chamber 56.

In the present engine mount 10 in which the deformation of the second elastic body 28 upon application of a dynamic vibrational load occurs primarily as the shearing strain of the thin-walled lateral elastic walls 24, 24, the second elastic body 28 does not have a significant value of spring stiffness in the static-load-receiving direction (diametric or radial direction). That is, most of the spring stiffness of the engine mount 10 in the static-load-receiving direction is provided by the first elastic body 16.

On the other hand, the two radial portions 16a of the first elastic body 16 undergo shearing deformation when subjected to the vibrational load applied in the diametric direction, i.e., the static-load-receiving direction. The deformation of the first elastic body 16 occurs also as the shearing deformation when the elastic body 16 receives a vibrational load applied in the axial direction of the engine mount 20. This means that the ratio of the spring stiffness of the engine mount 20 in the diametric direction to that in the axial direction can be readily adjusted to a desired value, by suitably determining or tuning the dimensions (e.g., wall thickness and axial width) of the first elastic body 16. Thus, the present arrangement makes it possible to construct the engine mount 20 such that the spring stiffness in the axial direction is higher than that in the diametric direction, which is not possible on the known fluid-filled cylindrical elastic mount as disclosed in the U.S. Patent identified in the BACKGROUND OF THE INVENTION. The applicant confirmed the feasibility that the spring stiffness in the axial direction is about 1.2 times that in the diametric direction, according to the present embodiment.

The instant engine mount 10 constructed as described above is capable of exhibiting sufficiently high spring stiffness with respect to the input vibrations applied in the axial direction, without sacrificing the damping effect based on the resonance of the fluid flow through the orifice passage 60. Therefore, the instant engine mount 10 minimizes the oscillating movements of the power unit relative to the vehicle body, and thereby effectively improves the driving comfort of the vehicle.

Further, the two radial elastic walls 26 which form the axially opposite walls of the pressure-receiving chamber 56 of the instant engine mount 10 provide respective two respective stoppers (stopper surfaces 34) in the bounding direction. Since an excessive vibrational load applied between the two sleeves 12, 14 is equally received by the two radial elastic walls 26 through these two stoppers 34, the durability of the second elastic body 28 is accordingly improved.

Referring next to FIGS. 11-18, a modified embodiment of the present invention will be described. The same reference numerals as used in the preceding embodiment of FIGS. 1-10 are used in FIGS. 11-18 to identify the corresponding elements, and no redundant description of these elements will be provided, in the interest of brevity and simplification.

Figure 12:
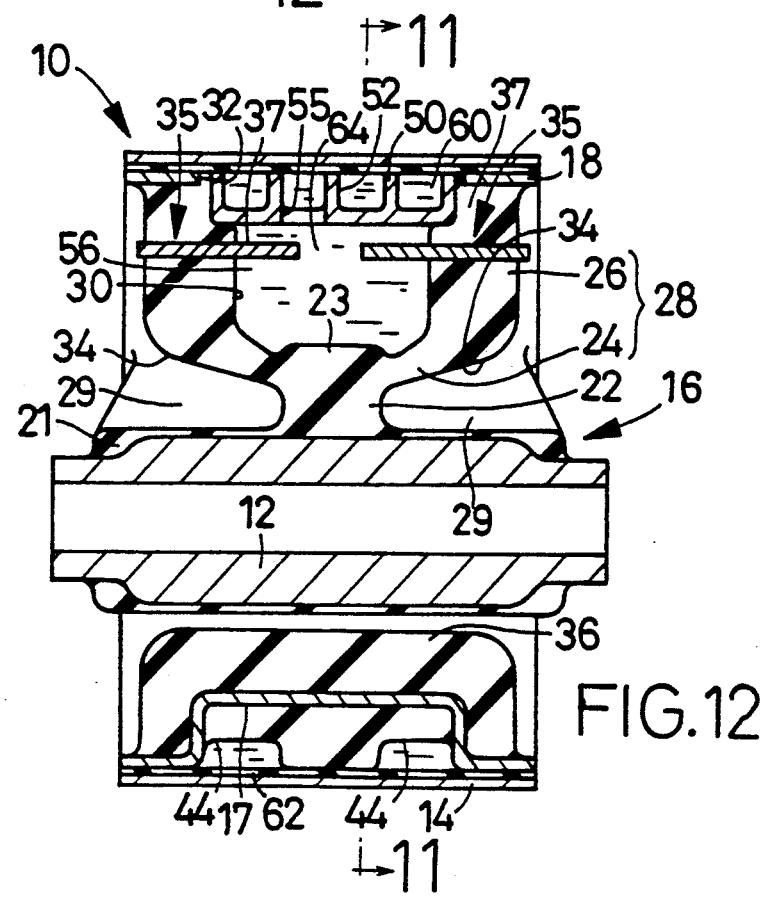
Figure 13:
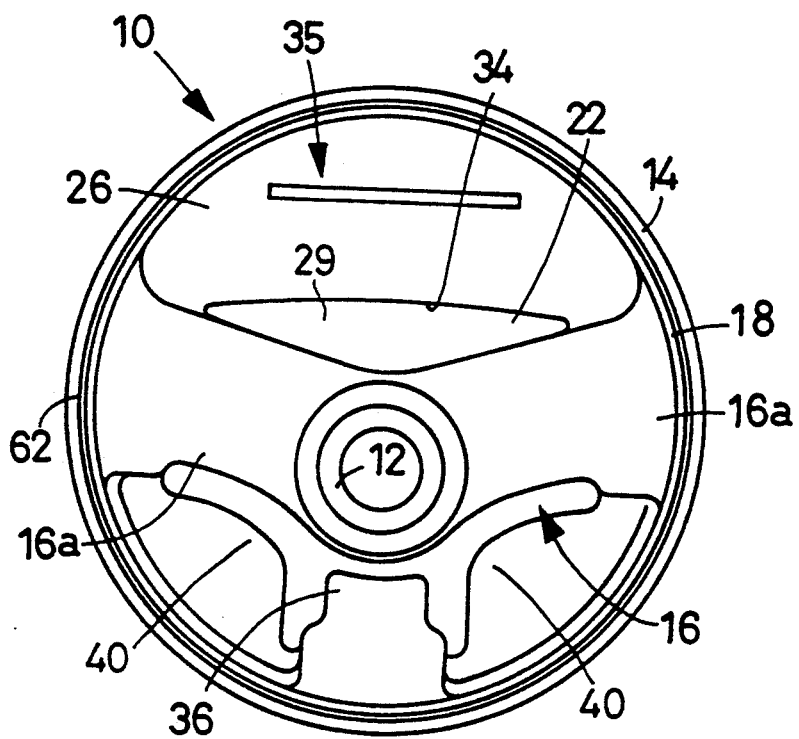
Figure 14:
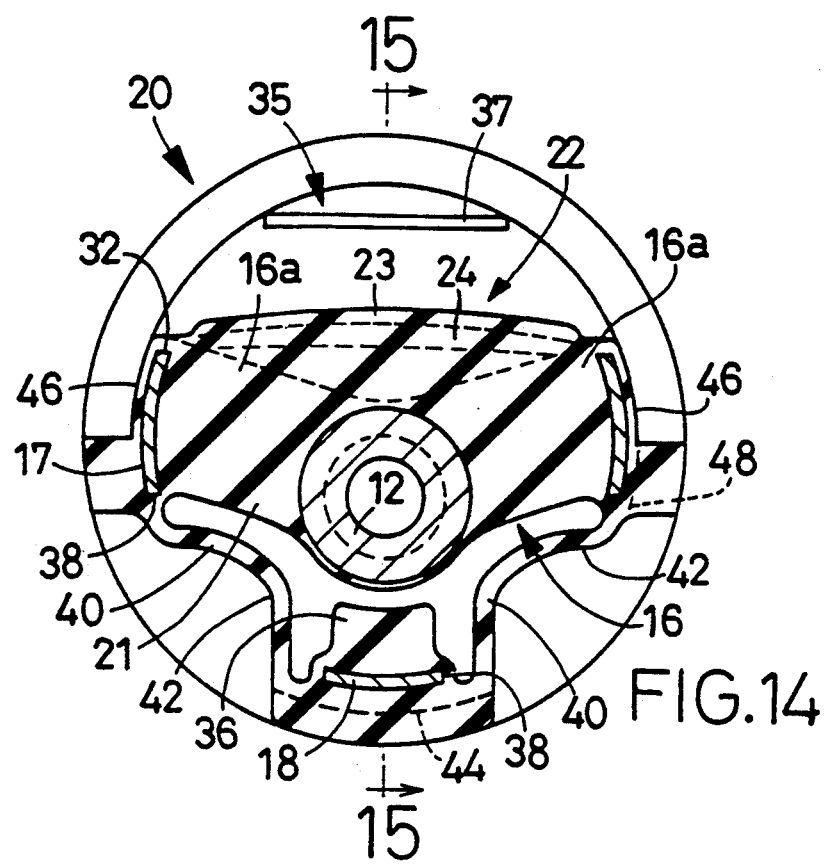
Figure 15:
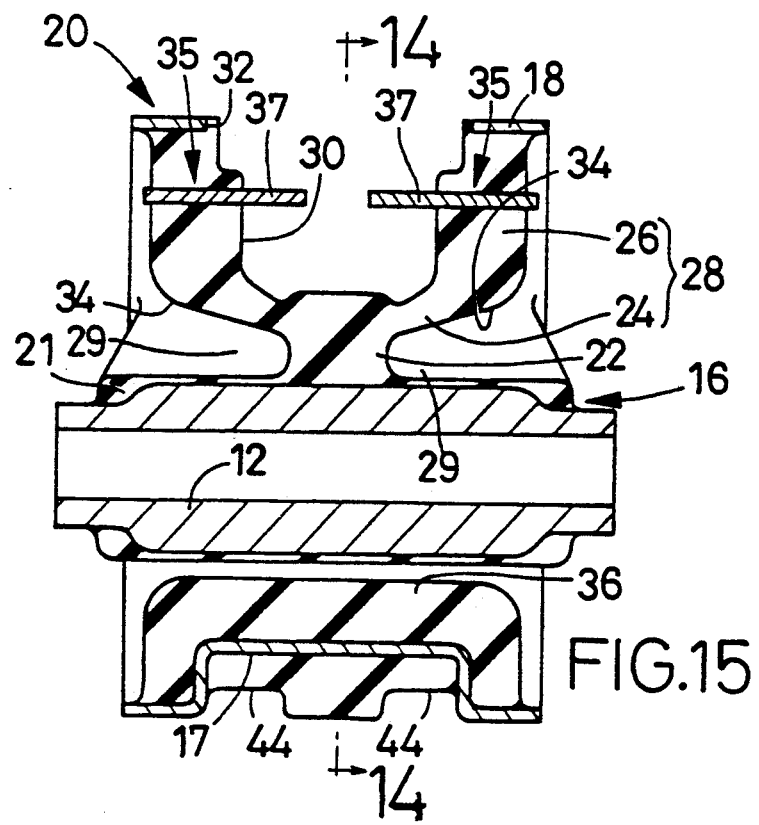
Figure 16:
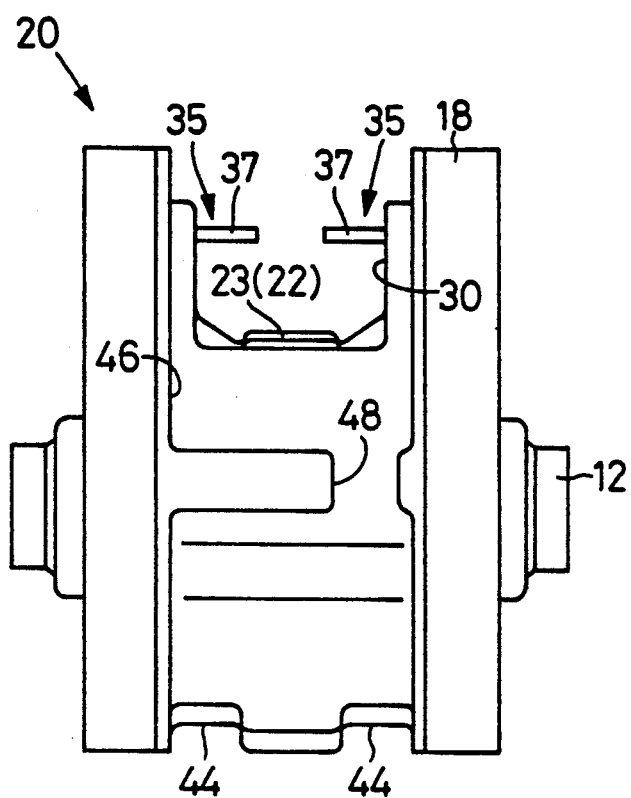
Figure 17:
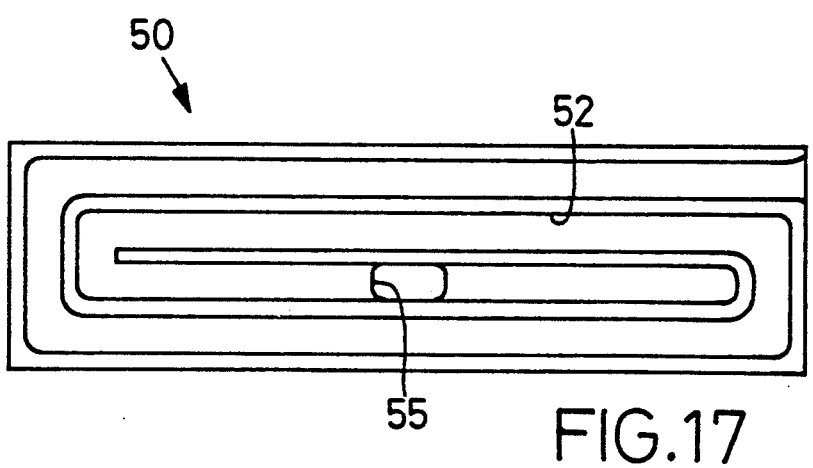
Figure 18:
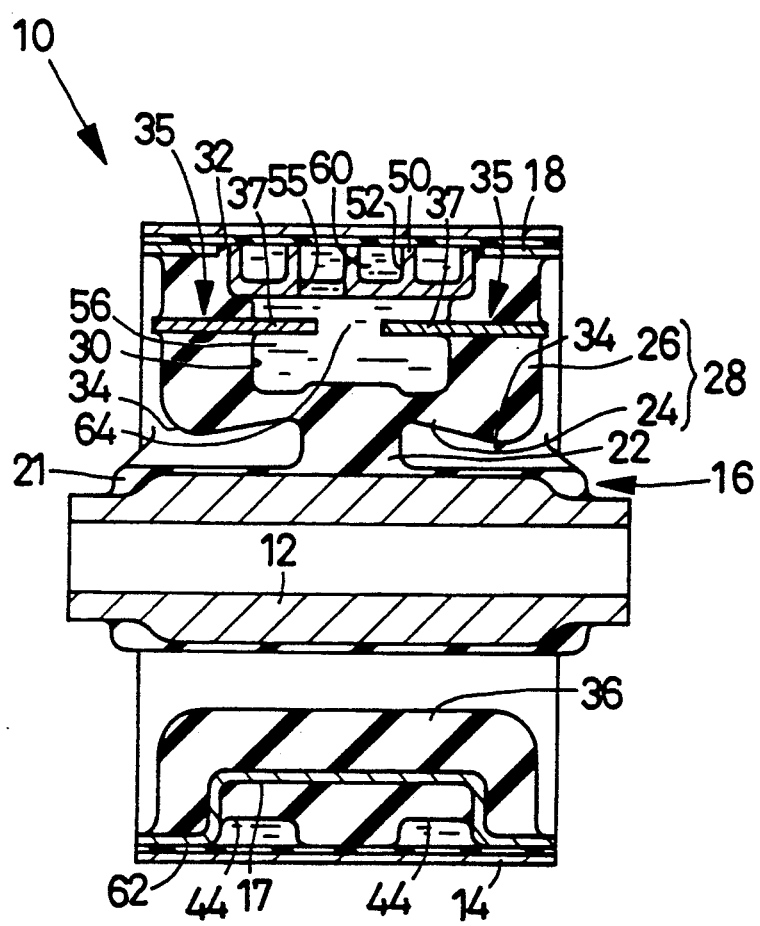

The engine mount 10 according to the present second embodiment uses a rectangular rigid plate 35 which is partially embedded in each of the two radial elastic walls 26 of the first elastic body 28, as most clearly shown in FIGS. 12 and 15. More specifically, the rigid plate 35 is partially embedded in a radially intermediate portion of each radial elastic wall 26, such that the rigid plate 35 extends in the axial direction of the engine mount 10, and in the direction substantially perpendicular to the static-load-receiving direction. The rigid plates 35 are secured to the respective radial elastic walls 26 by the vulcanization process to form the second elastic body 28. The rigid plates 35 function to limit the amount of expansion of the radial elastic walls 26 in the axial direction of the engine mount 10.

The two rigid plates 35 have respective extensions 37 which project from the axially opposite inner surfaces of the corresponding radial elastic walls 26, into the pressure-receiving chamber 56 (first pocket 30), such that the axially opposed end faces of the two extensions 37 are spaced apart from each other by a suitable distance in the axial direction of the engine mount 10, so as to define a flow restrictor 64 within the pressure-receiving chamber 56. The flow restrictor 64 is located in the axially central portion of the pressure-receiving chamber 56.

Figure 11:
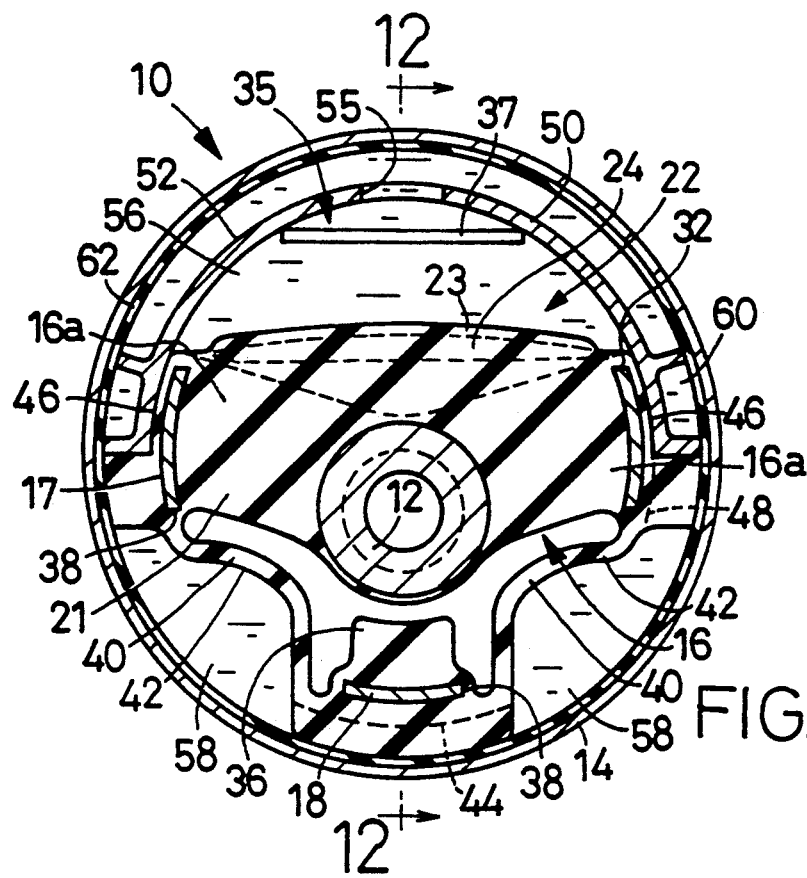
FIGS. 11-18 are views corresponding to those of FIGS. 1, 2, 4, 6, 7, 8, 9 and 10, respectively, showing another embodiment of the present invention.

In this second embodiment, the orifice member 50 has a through-hole 55 formed in a circumferentially intermediate portion thereof, unlike the through-hole 54 in the first embodiment, which is formed at the inner end of the groove 52 at one circumferential end of the member 50. In the present embodiment, the through-hole 55 is open to a circumferentially intermediate portion of the pressure-receiving chamber 56, as indicated in FIG. 11.

The two rigid plates 35 defining the flow restrictor 64 substantially divide the pressure-receiving chamber 56 into two sections, i.e., a radially inner section and a radially outer section which communicate with each other through the flow restrictor 64. Upon application of a dynamic vibrational load in the static-load-receiving direction, the fluid is forced to flow through the flow restrictor 64, due to elastic deformation of the second elastic body 28 caused by the vibrational load.

Since the flow restrictor 64 has a sufficiently large cross sectional area for the fluid flow therethrough, the instant engine mount 10 exhibits a effectively reduced dynamic spring constant with respect to booming noises and similar high-frequency vibrations. The range of the frequency of such high-frequency vibrations to which the engine mount 10 exhibits a sufficiently low dynamic spring constant can be suitably adjusted by appropriately determining or tuning the cross sectional area and radial dimension of the flow restrictor 64, namely, the cross sectional area of the opposed end faces of the extensions 37, distance between these end faces, and thickness of the extensions 37.

The thus constructed engine mount 10 according to the present second embodiment provides an excellent damping effect with respect to the low-frequency vibrations, based on the resonance of the fluid flowing through the orifice passage 60, and exhibits a sufficiently low dynamic spring constant based on the resonance of the fluid flowing through the flow restrictor 64, with respect to the high-frequency vibrations which do not cause the fluid to flow through the orifice passage 60. Accordingly, the flow restrictor 64 provided by the rigid plates 35 effectively minimizes or prevents an excessively high dynamic spring constant upon application of the high-frequency vibrations, whereby the engine mount 10 provides excellent damping and/or isolating characteristics over a wide range of frequency of the input vibrations.

Since the extensions 37 of the rigid plates 35 which define the flow restrictor 64 extend from the inner surfaces of the radial elastic walls 26 partially defining the periphery of the pressure-receiving chamber 56, the extensions 37 will not come into abutting contact with the other members such as the second elastic body 28 of the engine mount 10, irrespective of the directions in which the engine mount 10 receives the vibrational load. In other words, the provision of the rigid plates 35 does not have a possibility of deteriorating or lowering the vibration damping and/or isolating characteristics and durability of the engine mount 10.

It is also noted that the provision of the rigid plates 35 partially embedded in the radial elastic walls 26 of the second elastic body 28 restricts or limits the amount of expansion of the radial elastic walls 26, and thereby permits easy deformation of the lateral elastic walls 24, leading to effective volumetric change of the pressure-receiving chamber 56. This means an increased amount of the fluid which is forced to flow through the orifice passage 60 upon application of low-frequency vibrations, and an increased amount of the fluid which is forced to flow through the flow restrictor 64 upon application of high-frequency vibrations.

Moreover, the rigid plates 35 serve two functions, that is, prevent the expansion of the radial elastic walls 26 in the axial direction, and define between their extensions 37 the flow restrictor 64 within the pressure-receiving chamber 56. Thus, the flow restrictor 64 is provided by utilizing the rigid plates 35, or without using exclusive members. Accordingly, the instant modified engine mount of FIGS. 11–18 is relatively simple in construction and economical to manufacture.

Figure 19:
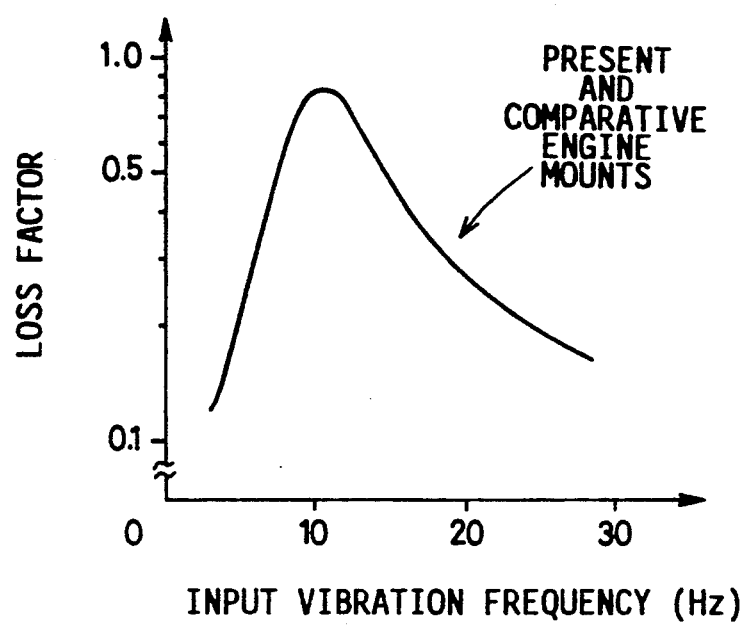
FIG. 19 is a graph indicating a similar operating characteristic of the engine mount of FIG. 11 and a comparative example, which was obtained in a test in which the engine mount was subjected to vibrations in a low-frequency range.
Figure 20:
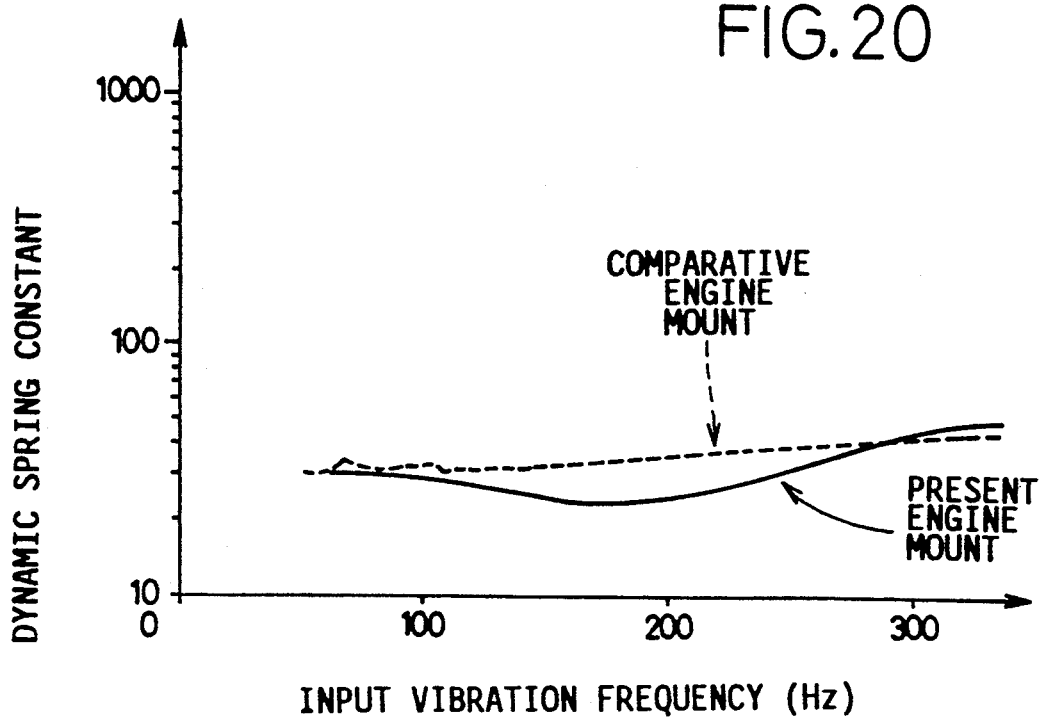
FIG. 20 is a graph indicating different operating characteristics of the engine mount of FIG. 11 and the comparative example, which was obtained in a test in which the engine mount was subject to vibrations in a high-frequency range.

The engine mount 10 of FIGS. 11–18 was tested to measure the loss factor when it was subjected to the low-frequency vibrations, and the dynamic spring constant when it was subject to the high-frequency vibrations. The measurements are indicated in the graphs of FIGS. 19 and 20, together with the measurements taken on a comparative example, which is a known engine mount without a flow restirctor within the pressure-receiving chamber. The test was conducted with a 100 kg weight of the vehicle power unit acting on the outer sleeve 14 in the static-load-receiving direction. The low-frequency vibrations had an amplitude of ±0.3 mm, while the high-frequency vibrations had an amplitude of ±0.05 mm.

It will be understood from the graphs of FIGS. 19 and 20 that the engine mount 10 according to the second embodiment of FIGS. 11–18 provided a sufficiently high damping effect with respect to the vibrations such as engine shakes and bounce whose frequency is in the neighborhood of 10 Hz, and at the same time exhibited a sufficiently low dynamic spring constant with respect to the vibrations such as booming noises whose frequency ranges from about 100 Hz to about 250 Hz.

While the present invention has been described above in detail with a certain degree of particularity, for illustrative purposes only, it is to be understood that the invention is not limited to the details of the illustrated embodiments, but may be otherwise embodied.

While the first and second elastic bodies 16, 28 are formed so as to cover about one-half of the circumference of the inner and outer sleeves 12, 14, the elastic bodies 16, 28 may cover a larger portion of the circumference of the engine mount 10.

In the illustrated embodiments, one pressure-receiving chamber 56 and two equilibrium chambers 58 are provided such that the chamber 56 communicates with the chambers 58 through the orifice passage 60. However, this arrangement may be modified as desired. For instance, the engine mount has one pressure-receiving chamber and one equilibrium chamber, or has a pair of pressure-receiving chambers, or three or more equilibrium chambers.

It is possible that the two equilibrium chambers 58, 58 may be replaced by a second pressure-receiving chamber disposed diametrically opposite to the chamber 56. In this case, a suitable flow restrictor may be provided also in this second pressure-receiving chamber.

While the orifice member 50 is used in the illustrative embodiments, any other types of orifice member may be provided, and the orifice passage for fluid communication of the fluid chambers may be designed as needed in terms of its configuration, length and cross sectional area, depending upon the required vibration damping-/isolating characteristics of the engine mount.

Although the central protrusion 22 as the connecting member connecting the second elastic body 28 to the inner sleeve 12 is formed as an integral part of the first and second elastic bodies 16, 28, the connecting member may be formed of a resinous or metallic material, provided that the connecting member is capable of transmitting a vibrational load from the inner sleeve 12 to the second elastic body 28.

In the second embodiment, the rigid plates 35 for preventing axial expansion of the radial elastic walls 26 are utilized to define the flow restrictor 64. However, the flow restrictor 64 may be defined by any other suitable means, such as metallic or resinous members which are separate from rigid members used to prevent the axial expansion of the radial elastic walls 26. The radial elastic walls 26 need not be provided with such rigid members. The flow restrictor 64 may be defined by extensions of the radial elastic walls which protrude into the pressure-receiving chamber 56.

While the two extensions 37, 37 are used to define the flow restrictor 64 in the illustrated second embodiment, the position and the direction of protrusion of those extensions are not limited to those of the illustrated embodiment, provided the extensions substantially divide the pressure-receiving chamber 56 into two sections, on the opposite sides of the extensions as seen in the static-load-receiving direction. Further, the flow restrictor 64 may be defined by a single member or three or more separate members. For instance, a single partition plate having a suitable flow restrictor aperture in its central portion may be secured to the inner wall surface of the pressure-receiving chamber 56, so that the chamber 56 is substantially divided into two sections by the partition plate.

It is also possible to provide the pressure-receiving chamber 56 with a protrusion which extends from the bottom wall of the chamber 56 into the flow restrictor 64, so that the resonance frequency of the fluid flowing through the flow restrictor 64 is determined by the size and length of such protrusion.

Although the illustrated embodiments of the present invention take the form of an engine mount for a motor vehicle, it is to be understood that the principle of the present invention is equally applicable to any other mounting devices such as differential gear mounts and suspension bushings for motor vehicle, and mounting devices used in various equipment and machinery other than the motor vehicle.

It is also to be understood that the present invention may be embodied with various changes, modifications and improvements other than those indicated above, which may occur to those skilled in the art, without departing from the spirit and scope of the invention defined in the following claims.

What is claimed is:

1. A fluid-filled cylindrical elastic mount for flexibly connecting two members such that a static load of one of the two members acts on the elastic mount in a diametric static-load-receiving direction thereof, comprising:

an inner sleeve fixed to one of the two members;

an outer sleeve disposed radially outwardly of said inner sleeve and fixed to the other of the two members;

a first elastic body having two radial portions which extend toward said outer sleeve from diametrically opposite circumferential portions of said inner sleeve, in respective radial directions of the elastic mount which are almost perpendicular to said static-load-receiving direction;

a connecting member extending toward said outer sleeve from a circumferential portion of an axially intermediate part of said inner sleeve, said circumferential portion of said axially intermediate part of the inner sleeve being positioned between said diametrically opposite circumferential portions of the inner sleeve in a circumferential direction of the inner sleeve, said connecting member being located on one of diametrically opposite sides of said inner sleeve in said static-load-receiving direction, on which a radial distance between said inner and outer sleeves is reduced by said static load;

a second elastic body including two lateral elastic walls which extend from respective opposite end faces of said connecting member which are opposed to each other in an axial direction of the elastic mount, said two lateral elastic walls being inclined by a predetermined angle in a radially outward direction of said inner sleeve as the lateral elastic walls extend in said axial direction, said second elastic body further including two radial elastic walls which have a larger thickness than said two lateral elastic walls and which extend from respective ends of said two lateral elastic walls in a radial direction parallel to said static-load-receiving direction;

said connecting member and said second elastic body cooperating to define a pocket which is closed by said outer sleeve, to define a pressure-receiving chamber filled with a non-compressible fluid and operable to undergo a volumetric change and a pressure change of the fluid therein upon application of a dynamic vibrational load between the inner and outer sleeves, a length of said pressure-receiving chamber in said axial direction of the elastic mount being greater than an axial length of said connecting member by axial lengths of said two lateral elastic walls of said second elastic body;

each of said two lateral elastic walls of said second elastic body cooperating with said outer sleeve and said two radial portions of said first elastic body, to define a recess which extends over a substantially entire length of said pressure-receiving chamber in a direction perpendicular to said static-load-receiving direction and said axial direction of the elastic mount, wherein the thickness and said predetermined angle of inclination of said two lateral elastic walls of said second elastic body are determined so that spring stiffness values of the elastic mount with respect to dynamic vibrational loads applied in said static-load-receiving direction and said axial direction are determined primarily by spring stiffness values of said first elastic body;

means including a flexible member, for defining a variable-volume equilibrium chamber filled with said non-compressible fluid, said equilibrium chamber being disposed on the other of said diametrically opposite sides of said inner sleeve on which the radial distance between said inner and outer sleeves is increased by said static load; and means for defining an orifice passage for fluid communication between said pressure-receiving chamber and said equilibrium chamber.

2. A fluid-filled cylindrical elastic mount according to claim 1, further comprising means which extends from inner surfaces of said radial elastic walls of said second elastic body, for defining a flow restrictor within said pressure-receiving chamber such that said flow restrictor substantially divides said pressure-receiving chamber in said static-load-receiving direction, into radially inner and radially outer sections.

3. A fluid-filled cylindrical elastic mount according to claim 2, wherein said means for defining a flow restrictor consists of extensions of two rigid plates which are embedded in said two radial elastic walls of said second elastic body, to prevent expansion of said two radial elastic walls in said axial direction of the elastic mount upon application of the dynamic vibrational load in said static-load-receiving direction, said extensions extending in said axial direction from axially opposite inner surfaces of said two radial elastic walls into said pressure-receiving chamber, such that said flow restrictor is defined by opposed end faces of said extensions which are remote from said axially opposite inner surfaces of said two radial elastic walls in said axial direction.

4. A fluid-filled cylindrical elastic mount according to claim 2, wherein said orifice-passage is tuned so as to effectively damp or isolate the dynamic vibrational load having frequencies around 15 Hz, based on resonance of flow of said fluid through said orifice passage, while said flow restrictor is tuned for providing a dynamic spring constant low enough to isolate the dynamic vibrational load having frequencies within a range of about 100–250 Hz.

5. A fluid-filled cylindrical elastic mount according to claim 1, wherein the thickness and said predetermined angle of inclination of said two lateral elastic walls of said second elastic body are determined so that said two lateral elastic walls undergo primarily shearing deformation upon application of a dynamic vibrational load between said inner and outer sleeves in said static-load-receiving direction.

6. A fluid-filled cylindrical elastic mount according to claim 1, wherein said two radial portions of said first elastic body are formed so that said two radial portions undergo primarily shearing deformation upon application of dynamic vibrational loads in said static-load-receiving direction and said axial direction.

7. A fluid-filled cylindrical elastic mount according to claim 1, wherein said connecting member is formed integrally with said first and second elastic bodies.

8. A fluid-filled cylindrical elastic mount according to claim 1, wherein said two radial elastic walls of said second elastic body have respective stopper surfaces which are spaced apart from said inner sleeve, for abutting contact with said inner sleeve upon application of an excessive dynamic vibrational load between said inner and outer sleeves in said static-load-receiving direction.

9. A fluid-filled cylindrical elastic mount according to claim 1, further comprising an orifice member disposed so as to cooperate with said connecting member and said second elastic body to define said pressure-receiving chamber, said orifice member having a groove in an outer surface thereof and a through-hole formed therethrough in communication with said groove, said groove communicating with said equilibrium chamber while said through-hole communicating with said pressure-receiving chamber, said outer surface of said orifice member being fluid-tightly covered by said outer sleeve, whereby said orifice passage is formed by said groove and said outer sleeve.

10. A fluid-filled cylindrical elastic mount according to claim 1, further comprising a stopper block disposed opposed to said other of said diametrically opposite sides of said inner sleeve, said stopper block being spaced apart from said inner sleeve, for abutting contact with said other of said diametrically opposite sides of said inner sleeve upon an excessive dynamic vibrational load between said inner and outer sleeves in said static-load-receiving direction.

11. A fluid-filled cylindrical elastic mount according to claim 1, wherein said inner sleeve is fixed to a body of a motor vehicle, while said outer sleeve is fixed to a power unit of the vehicle which includes an engine.

12. A fluid-filled cylindrical elastic mount according to claim 1, wherein said connecting member includes a protruding portion which protrudes into said pressure-receiving chamber from a bottom wall thereof defined by said two lateral elastic walls of said second elastic body extending from said opposite end faces of the connecting member.

* * * * *